(12) United States Patent
Wong

(10) Patent No.: US 7,133,859 B1
(45) Date of Patent: Nov. 7, 2006

(54) CATEGORY SPECIFIC SORT AND DISPLAY INSTRUCTIONS FOR AN ELECTRONIC DEVICE

(75) Inventor: Yoon Kean Wong, Menlo Park, CA (US)

(73) Assignee: Palm, Inc., Sunnyvale, CA (US)

( * ) Notice: Subject to any disclaimer, the term of this patent is extended or adjusted under 35 U.S.C. 154(b) by 122 days.

(21) Appl. No.: 09/755,782

(22) Filed: Jan. 5, 2001

(51) Int. Cl.
*G06F 17/30* (2006.01)

(52) U.S. Cl. .......................... 707/2; 707/7; 707/104.1; 455/418

(58) Field of Classification Search .................... 707/3, 707/2, 102, 200, 104.1, 10, 101, 7; 455/418
See application file for complete search history.

(56) References Cited

U.S. PATENT DOCUMENTS

| | | | | |
|---|---|---|---|---|
| 5,752,025 A | * | 5/1998 | Shakib et al. ................ | 707/102 |
| 5,809,497 A | * | 9/1998 | Freund et al. ................. | 707/2 |
| 5,995,940 A | * | 11/1999 | Ramaley ........................ | 705/9 |
| 6,199,082 B1 | * | 3/2001 | Ferrel et al. ................. | 715/522 |
| 6,226,739 B1 | * | 5/2001 | Eagle ........................... | 713/1 |
| 6,243,699 B1 | * | 6/2001 | Fish .............................. | 707/2 |
| 6,487,569 B1 | * | 11/2002 | Lui et al. ..................... | 715/530 |
| 6,493,722 B1 | * | 12/2002 | Daleen et al. .............. | 707/104.1 |
| 6,539,392 B1 | * | 3/2003 | Rebane ....................... | 707/101 |
| 6,593,949 B1 | * | 7/2003 | Chew et al. ................ | 345/841 |
| 2002/0165905 A1 | * | 11/2002 | Wilson ........................ | 709/203 |

OTHER PUBLICATIONS

AddressPro V4.0 (c) Copyright Jan. 2000 by ZingWare.*
AddressPro v4.0, Copyright Jan. 2000 by ZingWare.*

* cited by examiner

*Primary Examiner*—Leslie Wong

(57) ABSTRACT

A method and system providing category based sort and display instructions for a computer system having a database of information stored therein are described. A database of contact information is maintained in the computer with each record containing information related to a personal contact. Each record can be assigned a custom category type defining the kind of contact that the record is. The user is allowed to display a condensed listing of the contacts associated with each category. When the list is displayed, the list can be sorted by a field specific to that category type. Each category type can have its own sorting instructions. The sorting instructions also define the way in which the lists are displayed. The user can define and edit the category based instructions at any time.

18 Claims, 15 Drawing Sheets

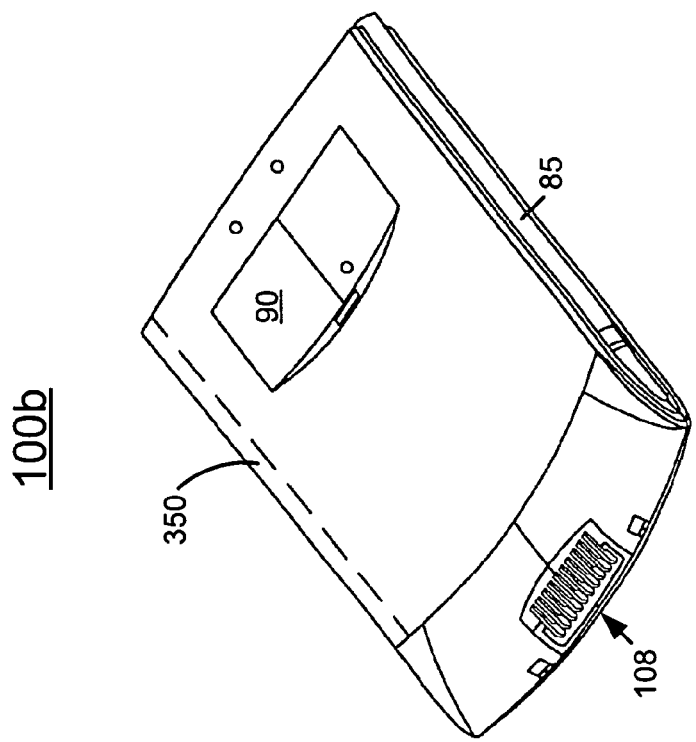
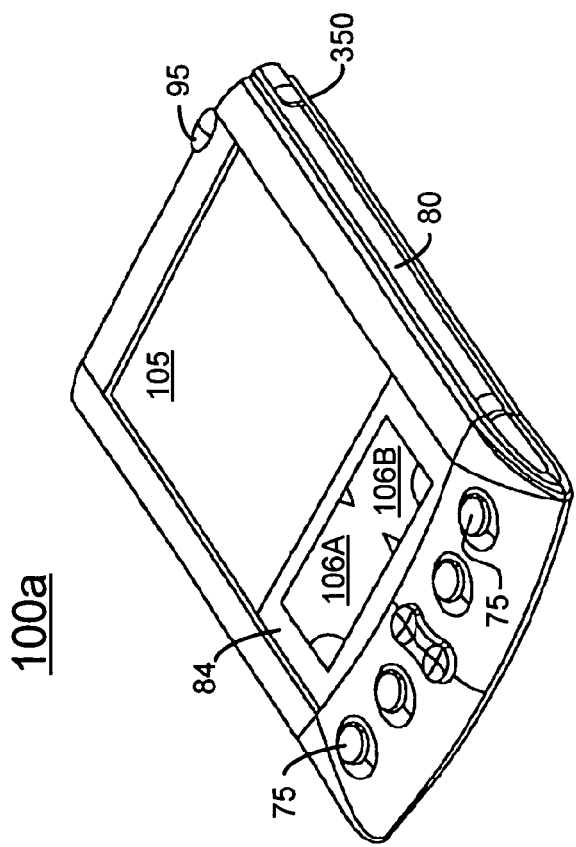
FIG. 2B
FIG. 2A

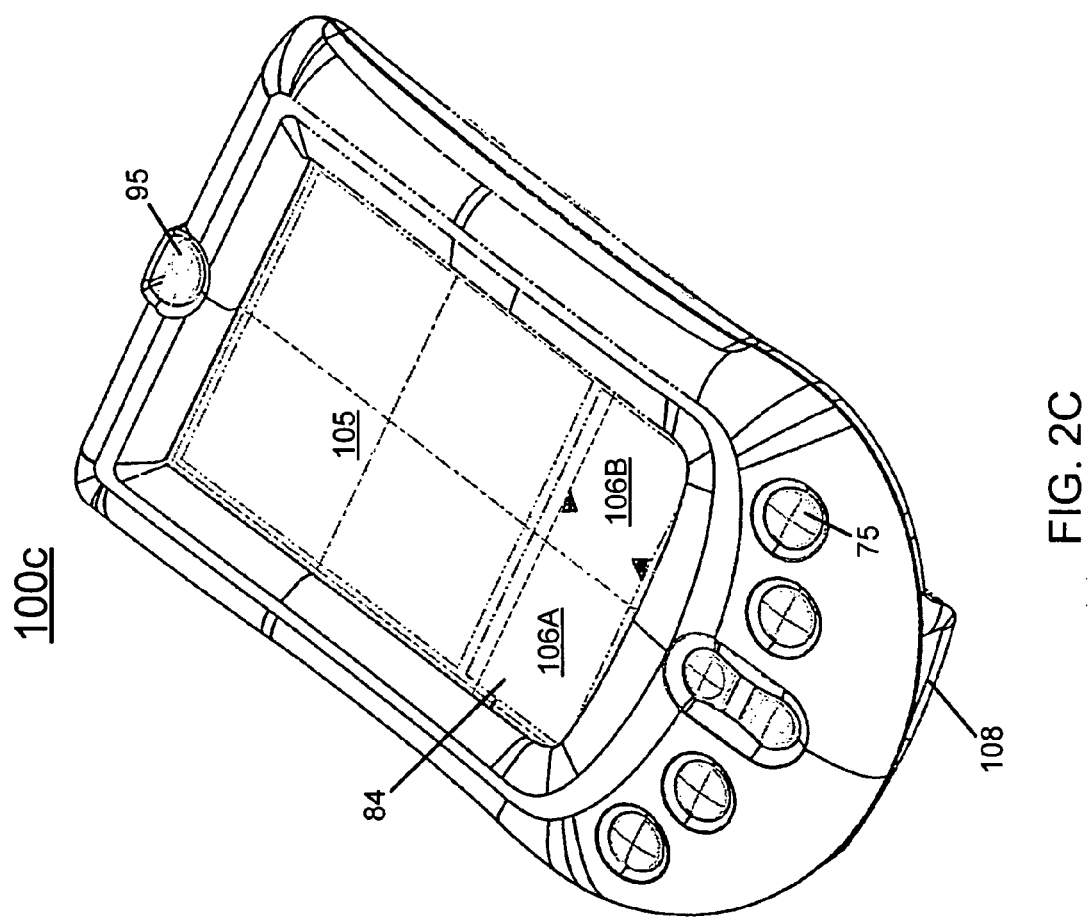

60

310

| | (1) | (2) | ... | (N) |
|---|---|---|---|---|
| CATEGORY | SORT/DISPLAY ORDER | SECONDARY | | |
| ALL | DEFAULT | DEFAULT | | |
| FRIENDS | LAST NAME | FIRST NAME | ... | |
| FAMILY | FIRST NAME | LAST NAME | | |
| BUSINESS | COMPANY NAME | LAST NAME | | |
| MAILER | ZIP CODE | CITY | | |

| ADDRESS | BUSINESS | |
|---|---|---|
| ALPHA COMPANY, MARTIN | | 555-6565 |
| ALPHA COMPANY, NOONS | | 555-7878 |
| ALPHA COMPANY, ROGERS | | 555-7842 |
| BOOM CO, CHARLES | | 555-6584 |
| BOOM CO, KATZ | | 555-1111 |
| BOOM CO, THATCHER | | 555-6547 |
| ELECTRIC CO, ADAMS | | 555-7775 |
| ELECTRIC CO, BAKER | | 555-3321 |
| ELECTRIC CO, DONNER | | 555-4587 |
| ELECTRIC CO, EDMUNDS | | 555-8945 |
| ELECTRIC CO, FLETCHER | | 555-9845 |
| GOVT OFFICES, RICHARDS | | 555-6974 |
| GOVT OFFICES, STANLEY | | 555-9825 |
| GOVT OFFICES, VINCENTS | | 555-6741 |
| RADIO CO, CUMMINGS | | 555-3245 |
| RADIO CO, JOHNSON | | 555-6944 |

LOOK UP . . .

FIG. 9

| ADDRESS | PERSONAL |
|---|---|
| ANDERSON, JERRY | 555-1122 |
| ARONSON, SID | 555-7800 |
| BERNAL, MANUAL | 555-7841 |
| CALFEE, DICK | 555-6284 |
| CROMWELL, TOM | 555-1211 |
| EKROOT, BOB | 555-6347 |
| FRAISER, TONY | 555-7375 |
| GRISWALD, RICHARD | 555-5321 |
| JOHNSON, BERRY | 555-4387 |
| KLEINE, DAVID | 555-8345 |
| LOVE, JOHN | 555-9245 |
| LOVE, RICHARD | 555-5974 |
| MULLIGAN, JANET | 555-7825 |
| MULLIGAN, NANCY | 555-6341 |
| NUMAN, JIM | 555-4245 |
| NUMAN, TERRY | 555-6954 |

LOOK UP . . .

ADDRESS | FAMILY

410C

| | |
|---|---|
| ANTHONY, BRUNER | 555-1142 |
| BETTY, BRUNER | 555-7800 |
| BOB, STRUTNER | 555-7841 |
| CAL, BRUNER | 555-6274 |
| DICK, BRUNER | 555-1271 |
| ED, BRUNER | 555-9754 |
| FRANK, STRUTNER | 555-7775 |
| GERALD, SMITH | 555-5371 |
| KAY, SMITH | 555-4377 |
| LENNIE, STRUTNER | 555-7345 |
| MARY, SMITH | 555-7245 |
| NICK, STRUTNER | 555-5774 |
| OLIVER, SMITH | 555-7725 |
| PEGGIE, BRUNER | 555-6741 |
| RUSTY, SMITH | 555-4745 |
| SAM, SMITH | 555-6974 |

LOOK UP . . .

CATEGORY SPECIFIC SORT AND DISPLAY INSTRUCTIONS FOR AN ELECTRONIC DEVICE

BACKGROUND OF THE INVENTION

1. Field of the Invention

The present invention relates to the field of data processing. More specifically, embodiments of the present invention relate to the display of information records stored within a database of an electronic device, e.g., a computer system, a portable computer system, a palmtop computer system, or any other hand-held electronic device that utilizes a display screen, such as a cell phone, a pager, etc.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been know as Personal Digital Assistants (PDAs). Many PDAs have a small and flat display screen associated therewith.

In addition to PDAs, other portable electronic devices have display screens, such as cell phones, electronic pagers, remote control devices and other wireless portable devices. All of these devices have been adapted to display short lists of information on the display screens to help the user organize and display information, e.g., phone records.

User convenience is a very important factor for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

A popular database program for displaying and organizing contact information is the "address book" database application found in PDAs and in some intelligent cell phones. This application allows a user to enter records concerning their personal contacts, e.g., person's name, address, company, telephone numbers, email addresses, etc. Each record can be assigned a particular category, e.g., friend, business, family, etc. When looking for records, the categories can be used as filters, e.g., a list of the records of a designated category can be displayed where each record is condensed into just one line in the display. The condensed list can be quite long and therefore provision is made allowing the user the ability to scroll up and down through the list.

The application program sorts the lists by a designated record field. For instance, the lists can be sorted, and thereby displayed in sort order, according to last name. However, in the "address book" database application, all categories of records are sorted based on the same designated record field regardless of the category designation. In other words, if the sort and display field is based on last name, then all records, e.g., family, friends, business contacts, etc., are sorted and displayed based on this field. Unfortunately, while last name may be an adequate sort field for friends, it may not be appropriate (and it may not be optimized) for locating business contacts. Importantly, a single sort preference for the entire application, irrespective of the individual category, does not allow users to customize their sort order based on how they, as individuals, remember people's contact information.

SUMMARY OF THE INVENTION

Accordingly, embodiments of the present invention provide an electronic device having a mechanism for displaying records in list form wherein each category of records can have its own specific sort and display instructions. Therefore, the present invention allows users to customize their sort order based on how they, as individuals, remember people's contact information. In other words, some people would like to sort business contacts by their business name, while others would like to sort by first name, as that is how they remember contacts, while others still may want to use last name. The present invention allows a user to customize the sort (and therefore display order) preference on a category-by-category basis. This allows information to be displayed and organized in an optimized fashion for each individual user and customized for each category type. The present invention provides these advantages and others not specifically mentioned above but described in the sections to follow.

A method and system are described that provide category based sort and display instructions for an electronic device having a database of information stored therein and a display screen. The electronic device may be a palm-sized computer system or personal digital assistant (PDA) in one example. The electronic device could also be a cell phone, pager, etc. A database of contact information is maintained in the computer with each record containing information related to a personal contact, e.g., first name, last name, company name, address, phone numbers, email address, etc. Each record can be assigned a custom category type defining the kind of contact that the record is, e.g., business, family, personal, etc. The user is allowed to display a condensed listing of the contacts associated with each category. When the list is displayed, the list can be sorted by a field specific to that category type. According to the invention, each category type can have its own sorting instructions. The sorting instructions also define the way in which the lists are displayed. The user can define and edit the category based instructions at any time. Therefore, users can sort the display order of their information based on the selected category. By providing an individual sort and display preference for each category, the user is free to optimize the sort order for each particular situation according to the invention.

For instance, person A may want business contacts to be sorted by company name, while personal contacts are sorted by last name but family contacts are sorted by first name. However, person B may want to sort business and personal contacts by first name. Person C may want to sort their business contacts by last name but their friends by first name. Each sort preference is based on the way in which each user remembers their contacts and is therefore optimized for the user according to the invention.

More specifically, an embodiment of the present invention is implemented in hand-held personal digital assistant having an address database of contact records of different categories and includes a method of displaying information comprising the steps of: a) receiving an indication from a user that selects a first category type of the different category types; b) indexing a table with the first category type to obtain a first sort field for the first category type, the table associating each category of the different categories with its own sort field; c) sorting contact records of the first category type by the first sort field obtained in step b) to produce a first list; and d) displaying a portion of the first list on a display screen of the electronic device.

Embodiments include the above and further comprise the steps of: receiving another indication from the user that selects a second category type of the different category types; indexing the table with the second category type to obtain a second sort field for the second category type; sorting contact records of the second category type by the second sort field obtained to produce a second list; and displaying in list order a portion of the second list on the display screen. Embodiments include the above and further comprising the steps of: assigning a default sort field for each category of the table; and allowing a user to define a particular sort field for each category of the table.

BRIEF DESCRIPTION OF THE DRAWINGS

FIG. 2A is a top side perspective view of a palmtop computer system that can be used in one embodiment of the present invention.

FIG. 2B is a bottom side perspective view of the palmtop computer system of FIG. 2A.

FIG. 2C is a perspective top view of another exemplary embodiment of a palmtop computer system.

FIG. 7 is a logical diagram of the memory resident sort table in accordance with one embodiment of the present invention.

FIG. 9 is an exemplary partial listing of "business" category records sorted and displayed on a display screen in accordance with one embodiment of the present invention using category-based sort instructions.

FIG. 10 is an exemplary partial listing of "personal" category records sorted and displayed on a display screen in accordance with one embodiment of the present invention using category-based sort instructions.

FIG. 11 is an exemplary partial listing of "family" category records sorted and displayed on a display screen in accordance with one embodiment of the present invention using category-based sort instructions.

DETAILED DESCRIPTION OF THE INVENTION

Figure 1:
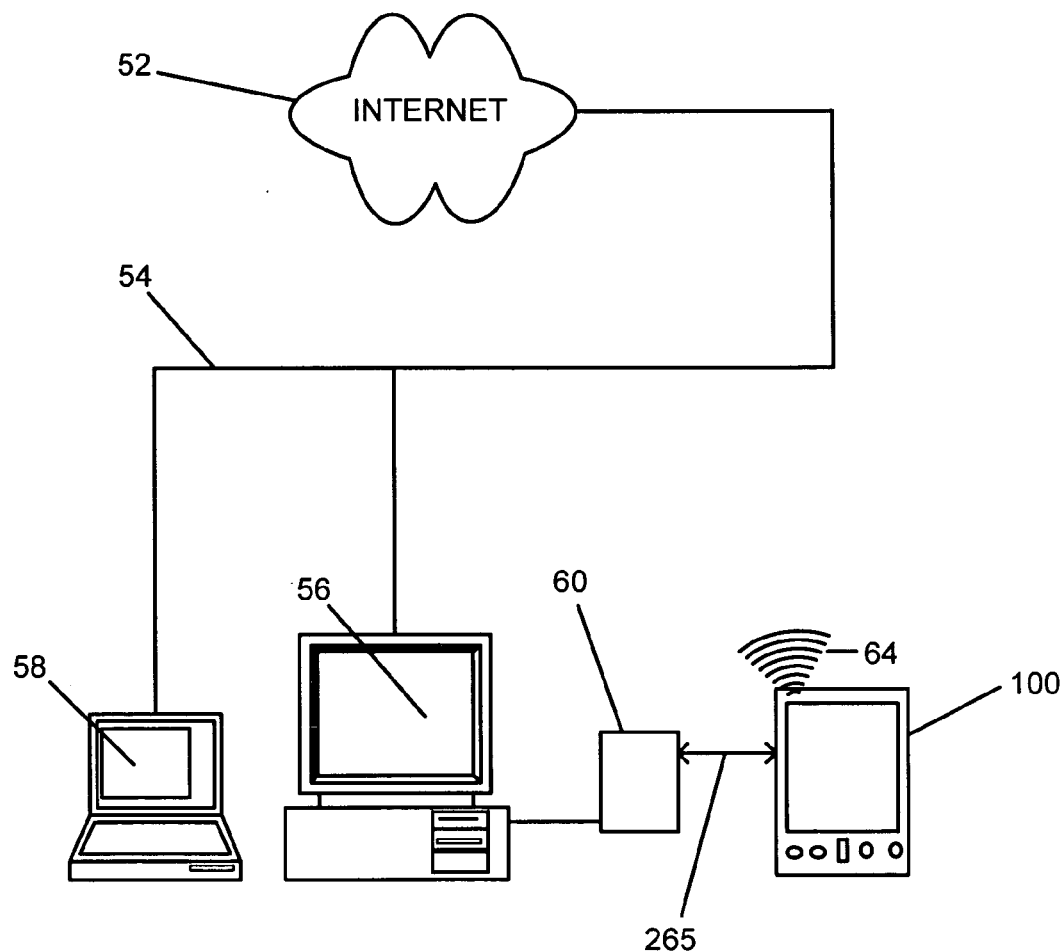
FIG. 1 is system illustration of a palmtop or "palm sized" computer system connected to other computer systems and the Internet via a cradle device.

In the following detailed description of the present invention, category based sort and display instructions for records of a database application within an electronic device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow (e.g., process 320 and process 420) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The processes of the present invention described herein are particularly applicable to portable electronic devices that have display screens and that organize database records. These devices include, for instance, cell phones, pagers and portable computer systems. Although applicable across a wide variety of platforms and devices, the present invention is described herein by example with respect to a portable computer system.

FIG. 1 illustrates an exemplary networked system 50 that can be used in conjunction with an embodiment of the present invention. System 50 is exemplary only and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 (or a separate communication channel) can provide communication with the Internet 52 using a number of well known protocols.

Importantly, bus 54 is also coupled to a cradle 60 (or cable dock) for receiving and initiating communication with an exemplary palmtop ("palm-sized") portable computer system 100. Cradle 60 provides an electrical and mechanical communication interface between bus 54 (and anything coupled to bus 54) and the computer system 100 for two way communications. Computer system 100 may also contain a wireless infrared communication mechanism 64 for sending and receiving information to or from other devices.

FIG. 2A is a perspective illustration of the top face 100a of one embodiment of the palmtop computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. Slot or rail 350 may contain switching devices for automatically powering down and automatically power up computer system 100a based on the position of the stylus 80. The top face 100a also contains one or more dedicated and/or programmable buttons 75 for selecting information and causing the computer system to implement functions. Other buttons (icons) can be implemented within a silk screen layer material 84 on which regions 106a and 106b reside. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
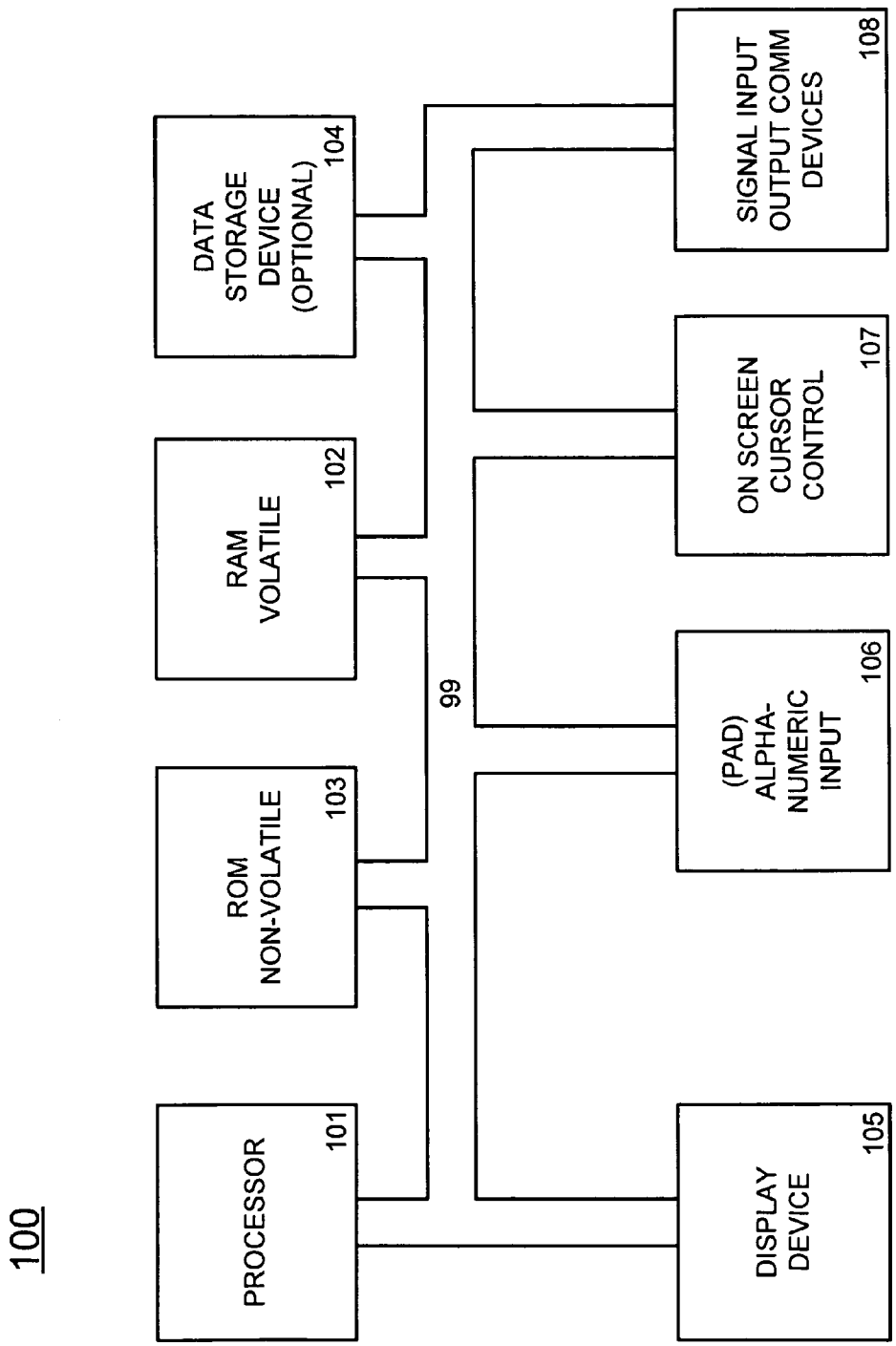
FIG. 5 is a logical block diagram of an exemplary palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

FIG. 2C illustrates a front perspective view of another implementation 100c of the palmtop computer system. As shown, the flat central area is composed of a display screen area 105 and a thin silk screen layer material portion 84. Typically, the silk screen layer material portion 84 is opaque and may contain icons, buttons, images, etc., graphically printed thereon in addition to regions 106a and 106b. The display screen area 105 and portion 84 are disposed over a digitizer.

Figure 3:
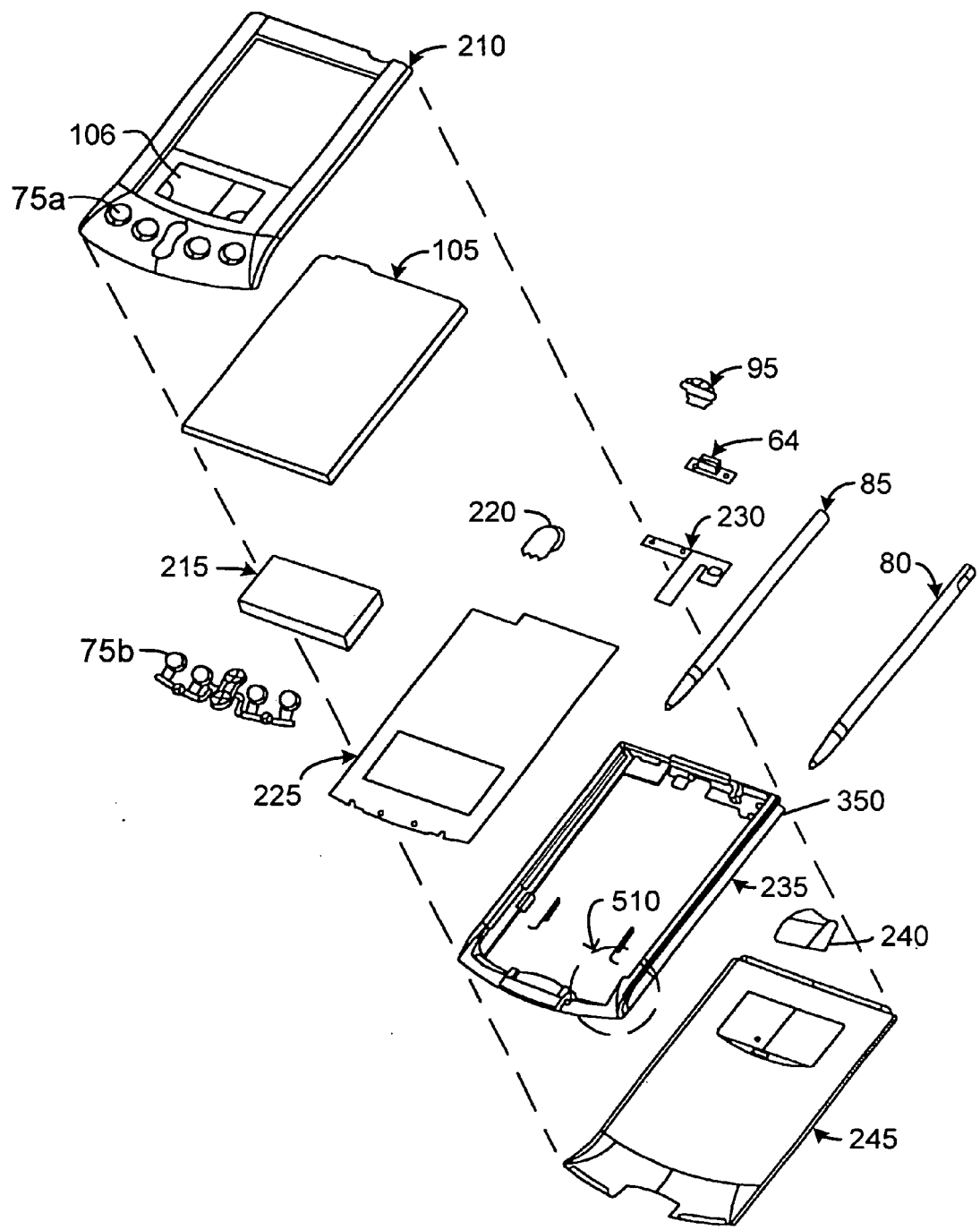
FIG. 3 is an exploded view of the components of an exemplary palmtop computer system of FIG. 2A.

FIG. 3 is an exploded view of the exemplary palmtop computer system 100. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. A contrast adjustment (potentiometer) 220 is also shown but can also be implemented electronically, e.g., by software, (FIG. 2C) without any manual knob. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Optional position adjustable antenna 85 is shown. The midframe 235 contains the stylus receiving slot or rail 350.

An optional radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
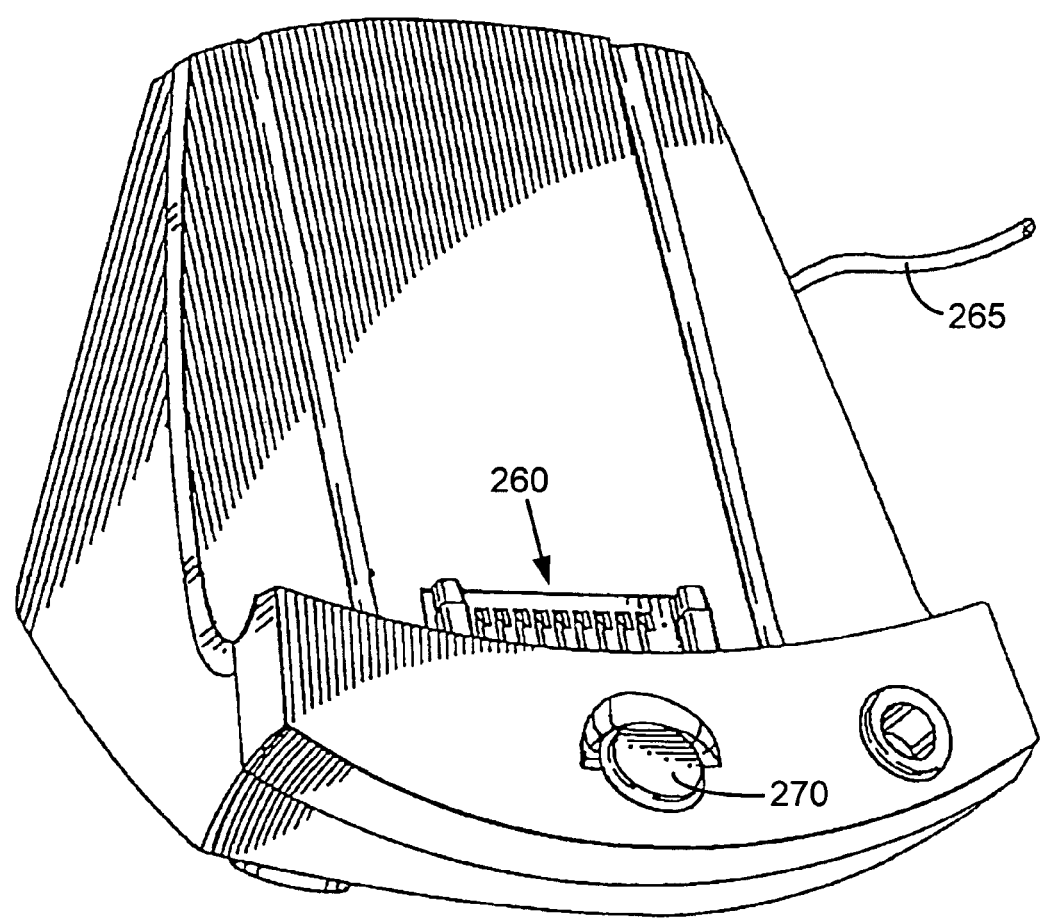
FIG. 4 is a perspective view of a cradle device for connecting a palmtop computer system to other systems via a communication interface.

FIG. 4 is a perspective illustration of one embodiment of the cradle 60 for receiving the palmtop computer system 100. In other embodiments, cradle 60 is not a stand-up device but is rather part of a cable connection between the palmtop computer system 100 and the desk top unit. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

FIG. 5 illustrates circuitry of palmtop computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In one embodiment, the display 105 utilizes color sequential scanning but could also utilize color filters with subpixels.

Signal communication device 108, also coupled to bus 99, can be a serial port for communicating with the cradle 60. Device 108 can also include an infrared communication port.

Figure 6:
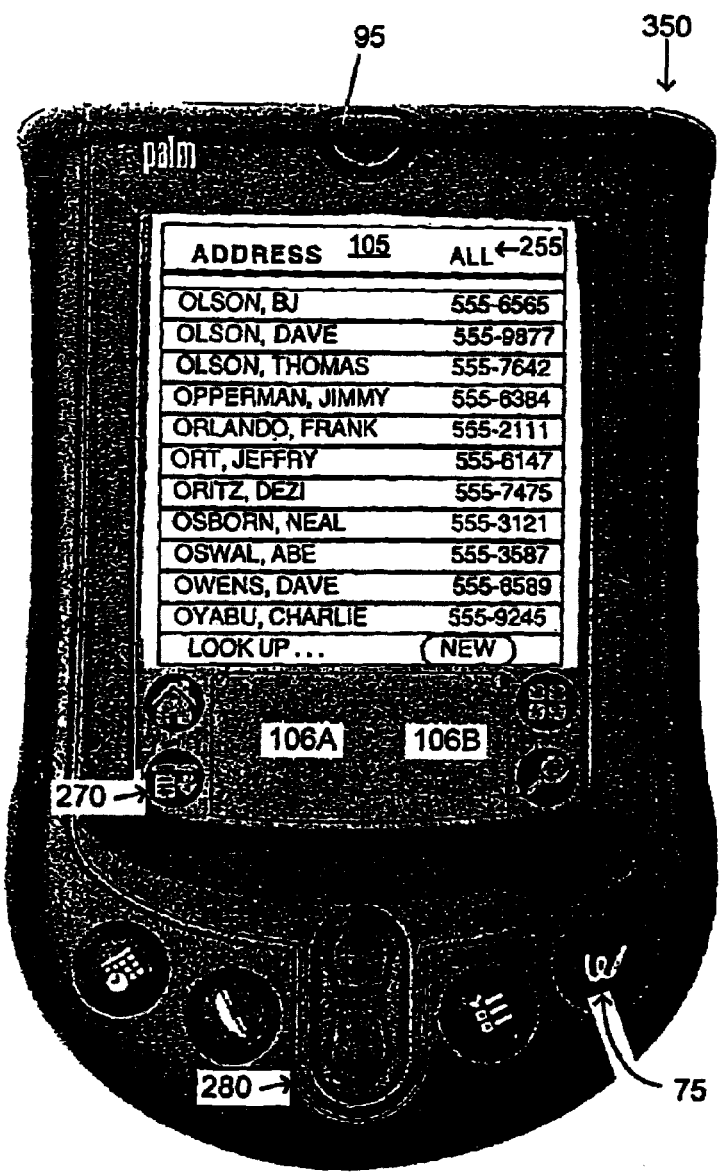
FIG. 6 is a front view of an exemplary palmtop computer system running the address book application and having multiple user interface selectors.

FIG. 6 illustrates device 100 which contains several icons 270 printed on the silk screen layer. These icons, e.g., a home icon, a menu icon, a calculator icon and a finder icon, are user selectors and when tapped with the stylus these icons cause certain applications to be executed or invoke menu options within applications that are currently being displayed. Also shown is a scroll selector 280. Scroll selector 280 has an up button and a down button to cause list scrolling on the display 105.

Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters. It is appreciated that, in one embodiment, the digitizer region 106a and 106b are separate from the display screen 105 and therefore does not consume any display area. Also shown in FIG. 6 is the position of the stylus receiving slot or rail 350. It is appreciated that while the stylus receiving slot or rail 350 is depicted on the right of the computer 100, it can also be deployed on the left or along the top edge or along the bottom edge.

Category-Based Sort and Display Instructions in Accordance with Present Invention FIG. 6 is a front view of an exemplary palmtop computer system 100 with an exemplary display of information within screen 105. It is appreciated that the present invention can be applied to any database application and the address book database application is only one example. In this example, the address book application is running and a condensed list of records is displayed, one record per line, on display 105. The condensed list is sorted by last name (primary) and first name (secondary). The scroll selector 280 can cause this list to scroll up or down.

The records in the address book application are associated with categories. The category 255 of records currently being displayed is "all" which includes all the categories. By changing the displayed category 255 (e.g., by tapping the category name), a filter is applied whereby the database application displays (in sort order) only those records that match the new category. In this example the database application is the address book database and it contains multiple records. The records contain contact information for different people, e.g., first name, last name, company name, company title, address, phone numbers, email numbers, etc. The records in FIG. 6 are therefore displayed only in list form. By tapping on a given record, its entire contents can then be viewed in a well known fashion.

The present invention includes a feature to a database application, e.g., the address book application, that allows each different category of information to be sorted (and thereby displayed) according to a set of sort instructions applicable to that category. Each defined category can have its own separate sort instructions.

FIG. 7 illustrates a memory resident sort table 310 used in this embodiment of the present invention for defining the particular sort instructions for each defined category. It is appreciated that a user can define as many or as few categories as they desire. The process for defining a new category is well known and any of a number of well known category defining processes can be used by the present invention. In the example given in FIG. 7, five different categories have been defined, "all," "friends," "family," "business," and "mailer" and are shown in column 310a. The categories define the type of records that are included in the database.

Associated with defined category are the sort instructions for that category. In this example, the sort instructions are defined record fields which are assigned to specific sort levels. If the user does not define sort instructions for a given category, then the default sort instructions are automatically assigned to that category. This example is shown with respect to the "all" category. In one embodiment, the default sort category is first by last name, then by first name.

In sort table 310, there can be assigned up to N levels of sorting for each category. Each sort level contains a field name. In the example shown in FIG. 7, only two sort levels are shown for brevity. In typical applications, most categories do not need more than two or three levels of sorting maximum. The primary sort field is shown in column 310b and the secondary sort field is shown in column 310c for each defined category. For instance, all business records are sorted first by the company name field, and then by the person's last name. All family records are sorted first by the first name field, and then by the person's last name. While sort instructions can be freely defined by a user for any category, the instructions typically represent the way in which the user views the contacts within the category, e.g., the instructions represent the optimal way in which a user will access and organize the records. For a business contact, the user may view the contact as first associated with a particular company that comes to mind when thinking of the person. However, for family members, the user may first think or remember the contact by his/her first name. By taking advantage of the different ways in which users organize contacts in their mind the present invention helps to facilitate users finding data using the electronic device.

The primary sort field is not only a sort level, but when the condensed list is displayed in the address book application, this field also represents the left-most displayed information in each record line (see FIGS. 9–11). The second sort field is also not just a sort level but also represents the second to the left-most information displayed in each record line. The right-most information displayed per record line is typically a phone number associated with the record.

Figure 8:
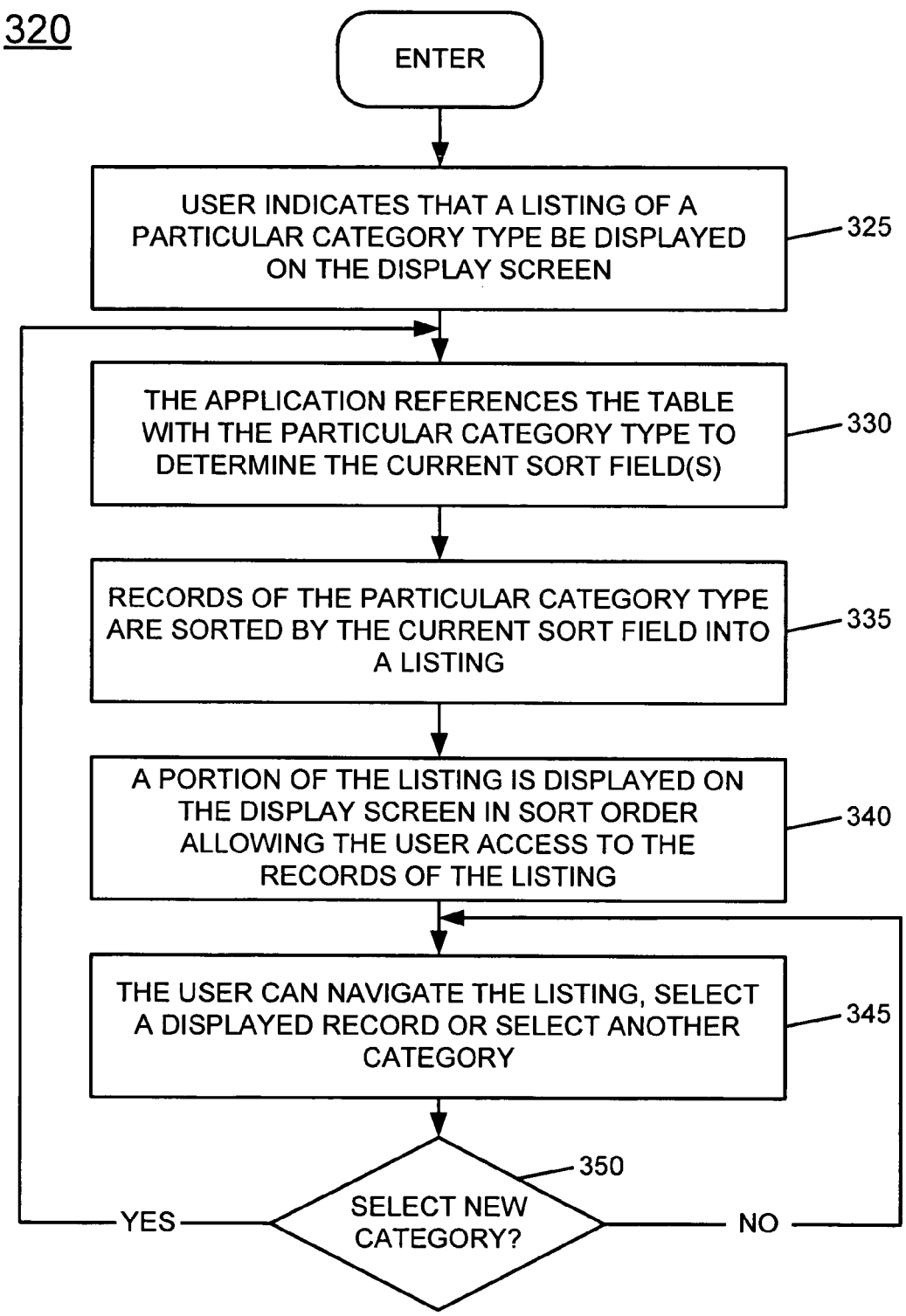
FIG. 8 is a flow diagram of a computer process in accordance with an embodiment of the present invention for sorting and displaying records of information according to category-based sort instructions.

FIG. 8 illustrates a computer implemented process 320 for implementing a category-based sorting and display embodiment of the present invention. At step 325, a user indicates that a condensed listing of a particular category of records is to be displayed on display 105. In one example, this is performed by a user depressing a designed button, e.g., the "phone" button located on the top side of the portable computer system 100. If the application program is already running, then step 325 can be performed by the user tapping on the category name 255 (FIG. 6) located on display 105. In any case, at step 325 a selected category name is given to the database application program.

At step 330, the database application program indexes the sort table 310 with the selected category name. The sort table 310 then returns the N levels of sort fields, from the primary sort field to the nth sort field, that are defined for the selected category name. At step 335, the database application then uses well known sorting heuristics to perform the sort function on the records of the selected category. Sorting can be done in ascending mode or descending mode. A listing is then generated in this sort order. The listing is condensed in that it only contains, for each record, information within the primary and secondary sort fields (and the phone number field).

At step 340, the database application then displays on screen 105 only a portion of this listing, e.g., a portion that fits in the display screen. The listing displayed is in the proper sort order as defined by the n level sort instructions obtained at step 330. FIG. 9 represents an example condensed listing 410a of records of the business category type generated by step 340 and displayed on screen 105. The business category name 255 is displayed for user reference. The primary sort field, e.g., "company name," is the left-most field in each record, followed by the "last name" field as defined by the sort table 310 (FIG. 7). The phone number is also display to the right in each record.

At step 345 of FIG. 8, the user can navigate through this condensed list 410. The user can use the scroll selector 280 (FIG. 6) to scroll up and down through the condensed listing. At any time, in a well known fashion, the user can tap on one of the display record lines to obtain the full record information. At step 345, the user can select another category, e.g., by depressing the phone button or by tapping on the category name 255. If this happens, then step 350 directs processing back to step 330. Otherwise, step 345 can be executed again for further record access or list navigation.

FIG. 10 represents an example condensed listing 410b of records of the personal category type (if selected by the user) generated by step 340 and displayed on screen 105. The personal category name 255 is displayed for user reference. The primary sort field, e.g., "last name," is the left-most field in each record, followed by the "first name" field as defined by the sort table 310 (FIG. 7) for this category. The phone number is also display to the right in each record.

FIG. 11 represents an example condensed listing 410c of records of the family category type (if selected by the user) generated by step 340 and displayed on screen 105. The family category name 255 is displayed for user reference. The primary sort field, e.g., "first name," is the left-most field in each record, followed by the "last name" field as defined by the sort table 310 (FIG. 7) for this category. The phone number is also display to the right in each record. In one example, depressing the phone number button cycles through each category in a round-robin fashion. However, by tapping on the category name 255, a pop-up list appears allowing the user to select any category directly.

Figure 12:
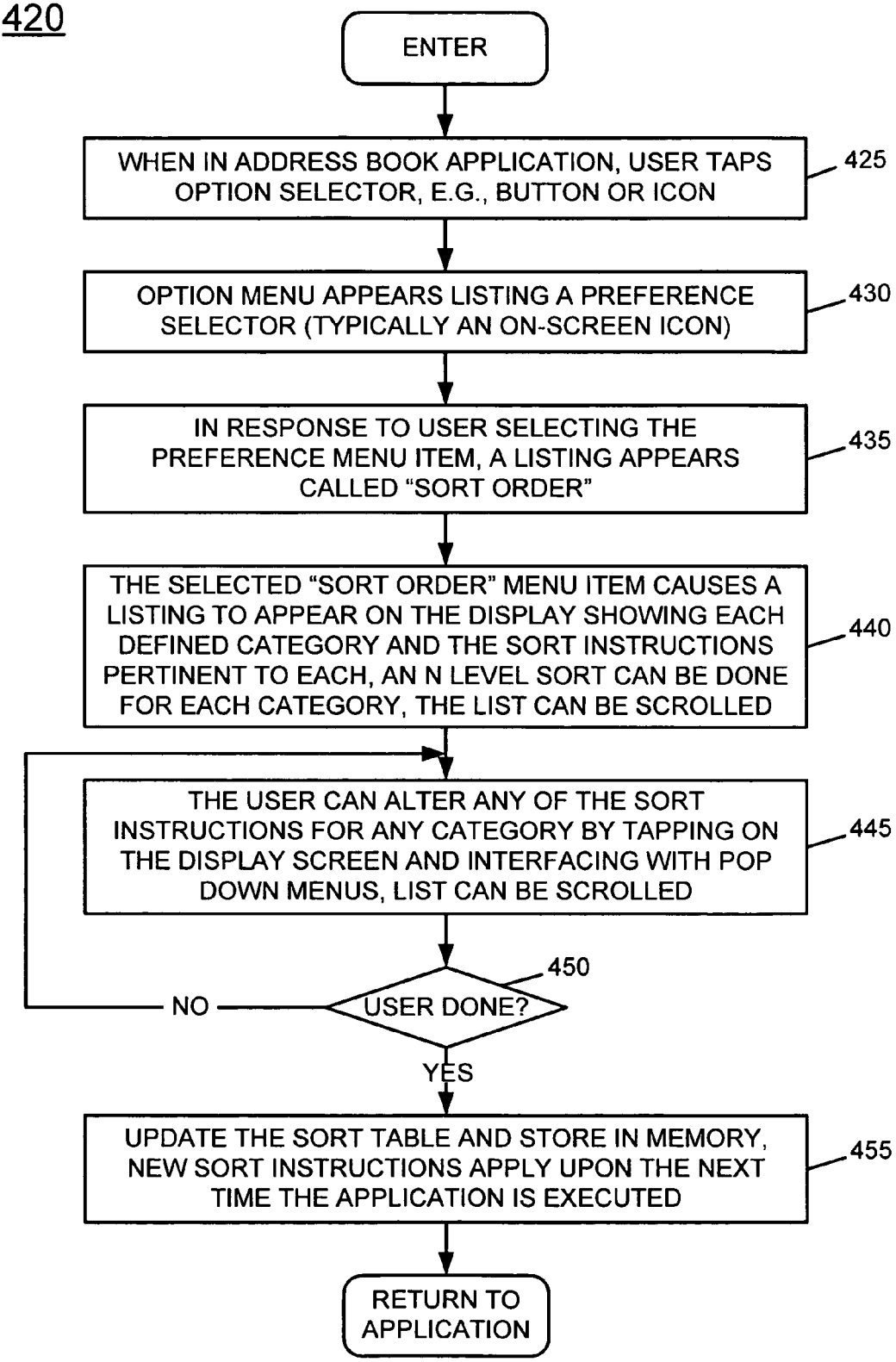
FIG. 12 is a flow diagram of a computer process in accordance with an embodiment of the present invention for constructing the memory resident sort table.
Figure 13A:
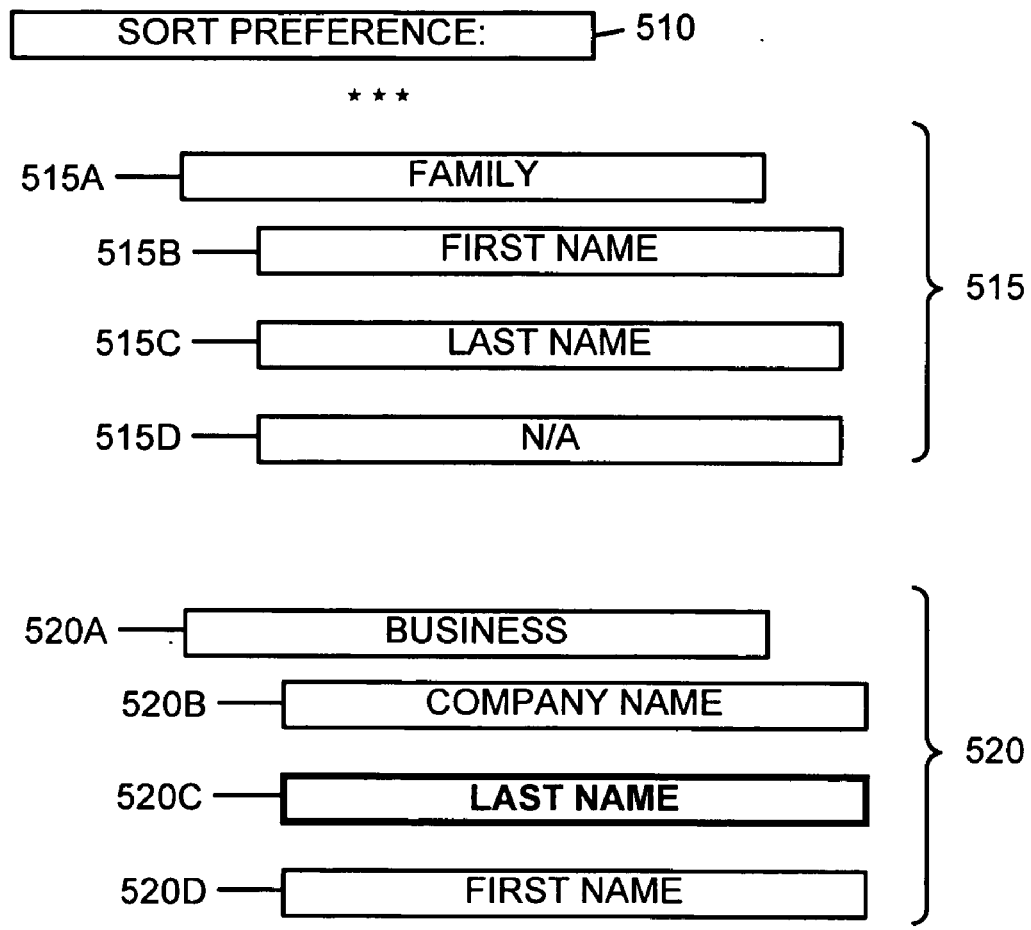
FIG. 13A and FIG. 13B illustrate screen shots of exemplary user interface tools that can be used by a user for programming and re-programming the memory resident sort table in accordance with an embodiment of the present invention.
Figure 13B:
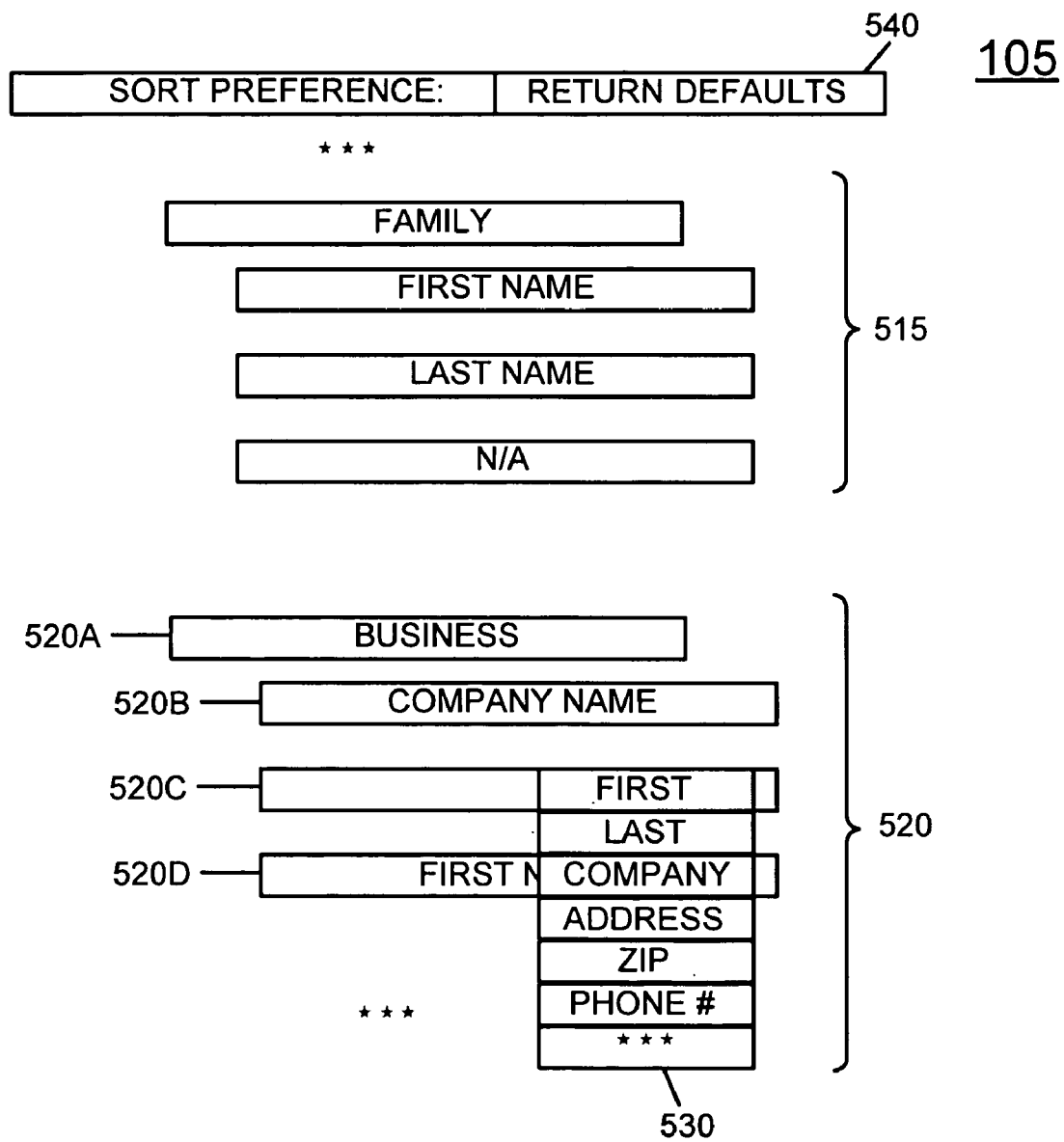

FIG. 12 and FIGS. 13A and 13B illustrate one exemplary user interface mechanism that can be used for allowing users to modify the contents of the memory resident sort table 310 thereby altering the sorting instructions for a given defined category. At step 425 of FIG. 12, when the user taps the option icon (e.g., selector 270 of FIG. 6) and the database application is concurrently running, then at step 430 a menu option bar appears in display 105. In this menu bar, an item called "preferences" is found. At step 435, in response to the user tapping the "preferences" item, a menu item called "sort order" is then displayed in another menu bar. At step 440, in response to the user tapping the "sort order" item, a listing of sort instructions currently stored in the sort table 310 appears in the display screen 105. A sample listing is shown in FIG. 13A. The sort order listing is of sort preferences and contains a separate group, e.g., 515 and 520, for each category.

At step 440, the sort order listing can be scrolled up and down by selector 280 displaying different groups. Each group contains the category name and the sort levels grouped for that category. Each sort level can be altered by user modification. For instance, the family category 515a of group 515 has primary sort field 515b, secondary sort field 515c and a third sort field 515d. The business category 520a of group 520 has primary sort field 520b, secondary sort field 520c and a third sort field 520d. At step 445 of FIG. 12, the user can change a displayed sort level of a category by tapping on that level. For instance, the secondary sort field 520c of group 520 is currently selected.

FIG. 13B illustrates the result of selecting a sort field for modification. Once field 520c is selected, a pop-down list 530 is displayed adjacent to the field and listing each field that can be selected. The user then selects one of the fields from the list 530 and that field then replaces the old field within 520*c*. It is appreciated that any sort field of FIG. 13B can be replaced in this fashion. As shown by step 450, a user can alter a number of different sort fields at a time. Once replaced, at step 445 of FIG. 12 the new sort field is then stored in the memory resident sort table 310 and may be used the next time the database application is executed. As shown in FIG. 13B, a user can return a category to defaults by highlighting a category name, e.g., 520*a*, and then tapping on 540.

By providing an individual sort and display preference for each category, the present invention allows the user to be free to optimize the sort order for each particular fashion.

The preferred embodiment of the present invention, category based sort and display instructions for records of a database application within an electronic device, is thus described. While the present invention has been described in particular embodiments, it should be appreciated that the present invention should not be construed as limited by such embodiments, but rather construed according to the below claims.

What is claimed is:

1. In an electronic device having a database of records of different category types, a method of displaying information, said method comprising:
   a) receiving an indication from a user that selects a first category type of said different category types;
   b) indexing a sort table with said first category type to obtain a primary sort field and a secondary sort field that have been selected by said user for said first category type, said sort table associating each category type of said different category types with its own primary and secondary sort fields that have been selected by said user, wherein sort fields for each category type are under user control and wherein said first category type has a primary sort field different from that of another category type;
   c) sorting records of said first category type into a first order that is determined according to said primary and secondary sort fields for said first category type to produce a first sorted list;
   d) displaying on a display screen of said electronic device at least a portion of said first sorted list, said first sorted list displayed in said first order determined according to said primary and secondary sort fields for said first category type, wherein said portion displayed is formatted automatically with information from said primary sort field for said first category type on the left-hand side of said display screen as viewed by said user, wherein by selecting said primary and secondary tertiary sort fields for said first category type said user controls said first order in which said records are displayed, wherein a record associated both with said first category type and with a second category type is displayed in said first order when said first category type is selected for display and in a different second order when said second category type is selected for display, said second order determined according to primary and secondary sort fields selected for said second category type;
   e) displaying on said display screen a group of sort instructions stored in said sort table, wherein displayed simultaneously are said primary and secondary sort fields that have been selected by said user for said first category type;
   f) receiving an indication from said user that selects said secondary sort field from the displayed primary and secondary and sort fields for said first category type; and
   g) in response to step f), displaying a pop-down list comprising sort fields that can be used for said first category type instead of said selected secondary sort field, wherein said user optionally replaces said secondary sort field for said first category type with a sort field selected from said pop-down list.

2. A method as described in claim 1 and further comprising:
   receiving another indication from said user that selects said second category type of said different category types;
   indexing said sort table with said second category type to obtain a primary sort field for said second category type;
   sorting records of said second category type into a third order that is determined by said primary sort field for said second category type to produce a second sorted list; and
   displaying on said display screen at least a portion of said second sorted list, said second sorted list displayed in said third order determined according to said primary sort field for said second category type.

3. A method as described in claim 1 wherein said electronic device is a palm-sized computer system.

4. A method as described in claim 1 wherein said electronic device is a wireless telephone.

5. A method as described in claim 1 wherein said database is a database of contact information comprising records each having fields defining a name, an address and a telephone number.

6. A method as described in claim 1 wherein said step a) comprises said user depressing a designated button on said electronic device.

7. In a hand-held personal digital assistant having an address database of contact records of different category types, a method of displaying information, said method comprising:
   a) receiving an indication from a user that selects a first category type of said different category types;
   b) indexing a sort table with said first category type to obtain a primary sort field, a secondary sort field and a tertiary sort field that have been selected by said user for said first category type, said sort table associating each category type of said different category types with its own primary, secondary and tertiary sort fields that have been selected by said user, wherein sort fields for each category type are under user control and wherein said first category type has a primary sort field different from that of another category type;
   c) sorting contact records of said first category type into a first order that is determined according to said primary, secondary and tertiary sort fields for said first category type to produce a first sorted list;
   d) displaying on a display screen of said hand-held personal digital assistant at least a portion of said first sorted list, said first sorted list displayed in said first order determined according to said primary, secondary and tertiary sort fields for said first category type, wherein said portion displayed is formatted automatically with information from said primary sort field for said first category type on the left-hand side of said display screen as viewed by said user, wherein by selecting said primary, secondary and tertiary sort fields for said first category type said user controls said first order in which said contact records are displayed, wherein a record associated both with said first category type and with a second category type is displayed in said first order when said first category type is selected for display and in a different second order when said second category type is selected for display, said second order determined according to primary, secondary and tertiary sort fields selected for said second category type;

e) displaying on said display screen a group of sort instructions stored in said sort table, wherein displayed simultaneously are said primary, secondary and tertiary sort fields that have been selected by said user for said first category type;

f) receiving an indication from said user that selects said secondary sort field from the displayed primary, secondary and tertiary sort fields for said first category type;

g) in response to step f), displaying a pop-down list comprising sort fields that can be used for said first category type instead of said selected secondary sort field, wherein said user optionally replaces said secondary sort field for said first category type with a sort field selected from said pop-down list;

h) receiving an indication from said user that selects said tertiary sort field; and i) in response to step h), displaying a pop-down list comprising sort fields that can be used instead of said selected tertiary sort field, wherein said user optionally replaces said tertiary sort field with a sort field selected from said pop-down list.

8. A method as described in claim 7 and further comprising:

receiving another indication from said user that selects said a second category type of said different category types;

indexing said sort table with said second category type to obtain a primary sort field for said second category type;

sorting contact records of said second category type into a third order that is determined by said primary sort field for said second category type to produce a second sorted list; and displaying on said display screen at least a portion of said second sorted list, said second sorted list displayed in said third order determined according to said primary sort field for said second category type.

9. A method as described in claim 7 wherein said hand-held personal digital assistant is a palm-sized computer system.

10. A method as described in claim 7 wherein said hand-held personal digital assistant is a wireless telephone.

11. A method as described in claim 7 wherein said address database comprises contact records each having fields defining a name, an address and a telephone number.

12. A method as described in claim 7 wherein said step a) comprises said user depressing a designated button on said hand-held personal digital assistant.

13. An electronic device comprising a processor, a display coupled to said processor and a memory coupled to said processor, said memory having a database of records of different category types and instructions implementing a method of displaying information, said method comprising:

a) receiving an indication from a user that selects a first category type of said different category types;

b) indexing a sort table with said first category type to obtain a primary sort field and a secondary sort field that have been selected by said user for said first category type, said sort table associating each category type of said different category types with its own primary and secondary sort fields that have been selected by said user, wherein sort fields for each category type are under user control and wherein said first category type has a primary sort field different from that of another category type;

c) sorting records of said first category type into a first order that is determined according to said primary and secondary sort fields for said first category type to produce a first sorted list;

d) displaying on said display screen at least a portion of said first sorted list, said first sorted list displayed in said first order determined according to said primary and secondary sort fields for said first category type, wherein said portion displayed is formatted automatically with information from said primary sort field for said first category type on the left-hand side of said display screen as viewed by said user, wherein by selecting said primary and secondary sort fields for said first category type said user controls said first order in which said records are displayed, wherein a record associated both with said first category type and with a second category type is displayed in said first order when said first category type is selected for display and in a different second order when said second category type is selected for display, said second order determined according to primary and second sort fields selected for said secondary category type;

e) displaying on said display screen a group of sort instructions stored in said sort table, wherein displayed simultaneously are said primary and secondary sort fields that have been selected by said user for said first category type;

f) receiving an indication from said user that selects said secondary sort field for said first category type from the displayed primary and secondary sort fields; and g) in response to step f), displaying a pop-down list comprising sort fields that can be used for said first category type instead of said selected secondary sort field, wherein said user optionally replaces said secondary sort field for said first category type with a sort field selected from said pop-down list.

14. An electronic device as described in claim 13 wherein said method further comprises:

receiving another indication from said user that selects said second category type of said different category types;

indexing said sort table with said second category type to obtain a primary sort field for said second category type;

sorting records of said second category type into a third order that is determined by said primary sort field for said second category type to produce a second sorted list; and displaying on said display screen at least a portion of said second sorted list, said second sorted list displayed in said third order determined according to said primary sort field for said second category type.

15. An electronic device as described in claim 13 wherein said electronic device is a palm-sized computer system.

16. An electronic device as described in claim 13 wherein said electronic device is a wireless telephone.

17. An electronic device as described in claim 13 wherein said database is a database of contact information comprising records each having fields defining a name, an address and a telephone number.

18. An electronic device as described in claim 13 wherein said step a) of said method comprises said user depressing a designated button on said electronic device.

\* \* \* \* \*